United States Patent
Kwon et al.

(10) Patent No.: US 6,522,739 B1
(45) Date of Patent: Feb. 18, 2003

(54) APPARATUS AND METHOD FOR MULTI-ACCESS CONFERENCE CALL IN EXCHANGE SYSTEM

(75) Inventors: Jin-Hyun Kwon, Seoul (KR); Byung-Wook Park, Kimhae (KR); Tae-Wan Kim, Pohang (KR); Jae-Sup Kwak, Suwon (KR); Joon Eom, Seoul (KR)

(73) Assignee: Samsung Thales Co., Ltd., Kyungsangbuk-do (KR)

( * ) Notice: Subject to any disclaimer, the term of this patent is extended or adjusted under 35 U.S.C. 154(b) by 0 days.

(21) Appl. No.: 09/474,370

(22) Filed: Dec. 29, 1999

(30) Foreign Application Priority Data

Dec. 30, 1998 (KR) .............................. 98-60841
Dec. 30, 1998 (KR) .............................. 98-60843

(51) Int. Cl.[7] .............................................. H04M 3/42
(52) U.S. Cl. ................................. 379/202.01; 370/260
(58) Field of Search ..................... 379/202.01, 205.01; 370/260; 375/240.03, 245

(56) References Cited

U.S. PATENT DOCUMENTS 3,937,898 A * 2/1976 Presto et al. ............... 370/263
4,035,724 A * 7/1977 Stephenne et al. ............ 341/61
4,044,306 A * 8/1977 Villeret et al. ................ 341/61

FOREIGN PATENT DOCUMENTS

CA    2069973     3/1993
EP    0659006 A2  6/1995

* cited by examiner

Primary Examiner—Ahmad F. Matar
Assistant Examiner—Quynh Nguyen
(74) Attorney, Agent, or Firm—Robert E. Bushnell, Esq.

(57) ABSTRACT

A multi-access conference call apparatus and method in an exchange system. The multi-access conference call apparatus, which permits a number of subscribers to communicate with each other using their own terminal, includes: a digital signal processing unit for converting a signal of a first digital signal type from each of a plurality of subscriber channels to a signal of a second digital signal type, for summing the signals of the second digital signal type of all subscriber channels except for the signal from the subscriber's own channel, and for converting the summed data for each subscriber channel back to the signals of the first digital signal type, to output the resulting signals of the first digital signal type to each subscriber channel; and a control signal generator for generating control signals for transmitting the signals of the first digital signal type input from each fi subscriber channel, to the digital signal processing unit, and transmitting the signals of the first digital signal type output from the digital signal processing unit, to each corresponding subscriber channel.

14 Claims, 3 Drawing Sheets

APPARATUS AND METHOD FOR MULTI-ACCESS CONFERENCE CALL IN EXCHANGE SYSTEM

CLAIM OF PRIORITY

This application makes reference to, incorporates the same herein, and claims all benefits accruing under 35 U.S.C §119 from an application entitled Apparatus And Method For Multi-Access Conference Call In Exchange System earlier filed in the Korean Industrial Property Office on Dec. 30, 1998, and there duly assigned Serial No.'s 98-60841 and 98-60843 by that Office.

BACKGROUND OF THE INVENTION

1. Field of the Invention

The present invention relates to a multi-access conference call apparatus and method in an exchange system, which allow a plurality of subscribers to communicate with each other.

2. Description of the Related Art

Private exchanges are commonly used in most companies and offices. Typically, the private exchange includes a private automatic branch exchange (PABX) and a keyphone system. The private exchange, which uses a telephone line between a private branch exchange (PBX) and a telephone exchange, allows an interphone-to-telephone connection and an interphone-to-interphone connection.

Such a private exchange also provides a conference call function among a plurality of subscribers. As for the conference call function, a plurality of subscribers communicate with each other through interphone lines connected to their own terminals, wherein the number of participants, i.e., the conference group size, is predetermined by the private exchange. In other words, the conference participants can listen to the voices of all the participants, and can transmit their own voice to the other participants at any time. The conference call function, also known as a paging function for paging one or more extensions, provides advantages when a group of participants cannot gather at one point for a conference.

FIG. 1 is a block diagram of a conventional multi-access conference call apparatus in an exchange system. The conference call apparatus of FIG. 1 includes a plurality of continuously variable slope delta modulation (CVSD) coders/decoders (CODECs) 100, 102 and 104, and a plurality of operational (OP) amplifiers 106, 108 and 110. The CVSD CODECs 100, 102 and 104 decode CVSD data received from a plurality of subscriber channels, convert the decoded data to analog signals, and output the analog signals to the OP amplifiers 106, 108 and 110, respectively. The OP amplifiers 106, 108 and 110 sum and amplify the received signals, and return the amplified signals to the CVSD CODECs 100, 102 and 104, respectively. The CVSD CODECs 100, 102 and 104 encode the signals from the OP amplifiers 106, 108 and 110, respectively, and transmit the encoded data to the corresponding subscriber channels.

However, since the conventional conference call apparatus transmits analog signals to the OP amplifiers 106, 108 and 110, it is prone to noise during signal transmission. Also, when it is required to increase the group size, the scale of hardware must be extended. That is, more CVSD CODECs and OP amplifiers, corresponding to the increased group size, are required.

SUMMARY OF THE INVENTION

An object of the present invention is to provide a multi-access conference call apparatus and method in an exchange system, in which received continuously variable slope delta modulation (CVSD) data are digitally transmitted to each of a plurality of subscriber terminals.

According to an aspect of the present invention, there is provided a multi-access conference call apparatus in an exchange system, which permits a number of subscribers to communicate with each other using their own terminal, the conference call apparatus comprising: a digital signal processing unit for converting a signal of a first digital signal type from each of a plurality of subscriber channels to a signal of a second digital signal type, for summing the signals of the second digital signal type of all subscriber channels except for the signal from the subscriber's own channel, and for converting the summed data for each subscriber channel back to the signals of the first digital signal type, to output the resulting signals of the first digital signal type to each subscriber channel; and a control signal generator for generating control signals for transmitting the signals of the first digital signal type input from each subscriber channel, to the digital signal processing unit, and transmitting the signals of the first digital signal type output from the digital signal processing unit, to each corresponding subscriber channel.

According to another aspect of the present invention, there is provided a multi-access conference calling method, which permits a number of subscribers to communicate with each other using their own terminal, in an exchange system, the conference calling method comprising the steps of: (a) a subscriber pressing a start key of a his or her terminal for a conference call with the other subscribers; (b) the exchange system converting a signal of a first digital signal type received from each subscriber channel into a signal of a second digital signal type; (c) the exchange system summing the signals of the second digital signal type of all subscriber channels except for the subscriber's own channel, for each subscriber channel; (d) the exchange system converting the summed signals of the second digital signal type to the signals of the first digital signal type, and transmitting the resulting signals of the first digital signal type to each corresponding subscriber channel; and (e) the subscriber pressing a termination key so as to terminate the conference call.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
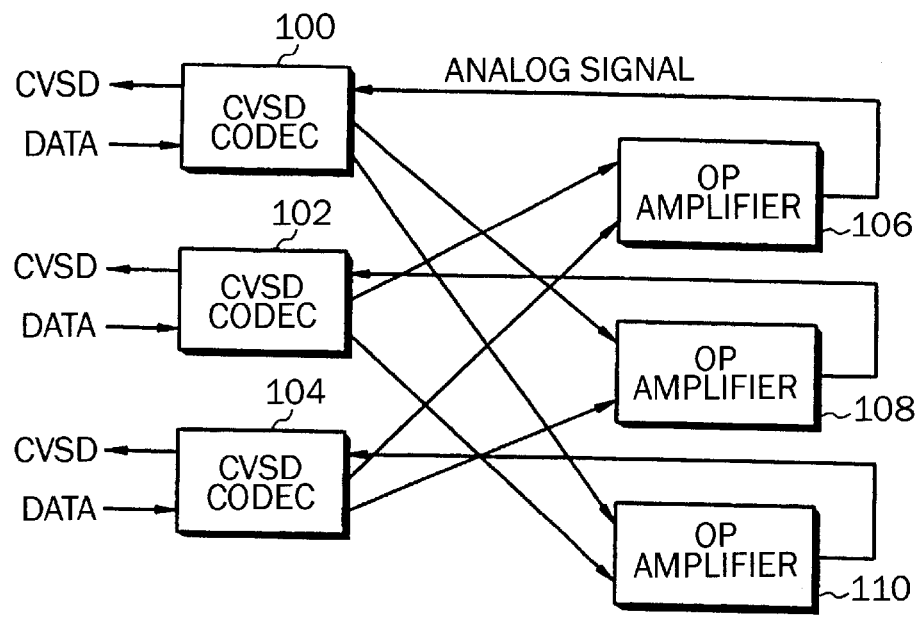
FIG. 1 is a block diagram of a conventional multi-access conference call apparatus in an exchange system.
Figure 2:
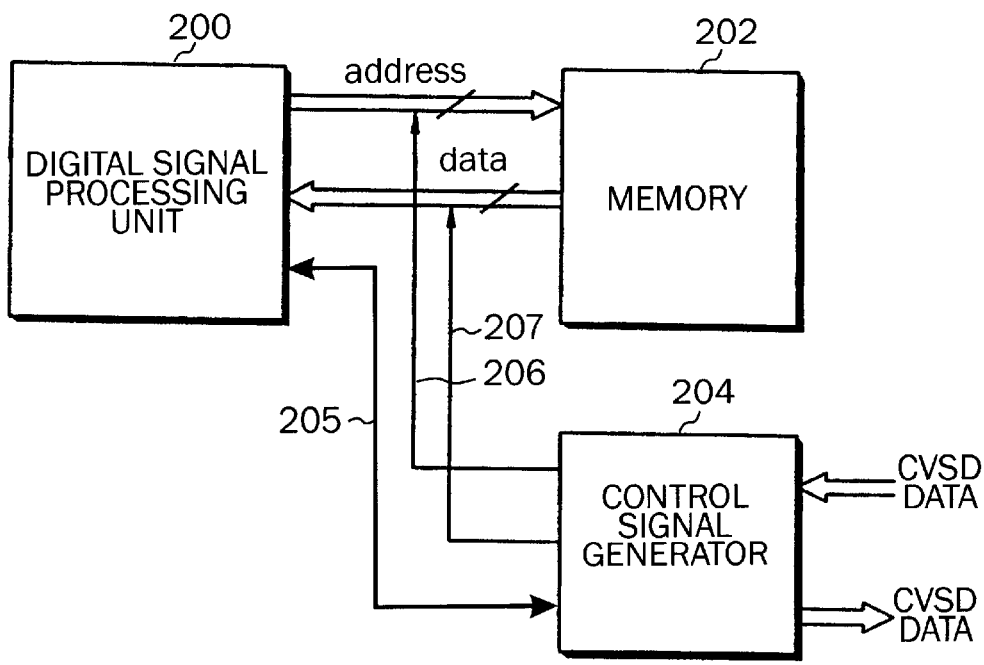
FIG. 2 is a block diagram of a multi-access conference call apparatus in an exchange system according to the present invention.
Figure 3:
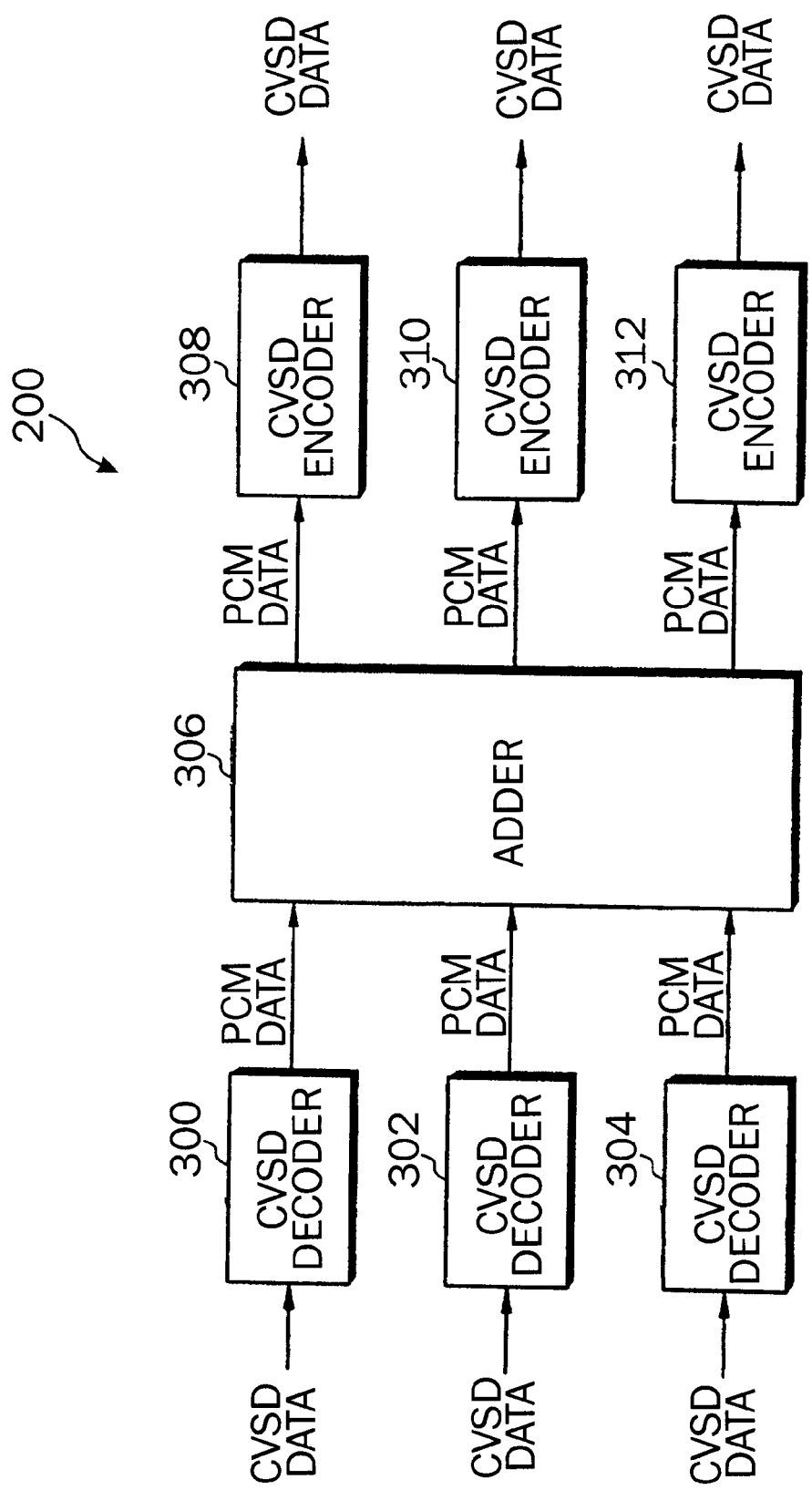
FIG. 3 is a detailed block diagram of the digital signal processing unit of FIG. 2.

Referring to FIG. 2, which is a block diagram of a multi-access conference call apparatus in an exchange system according to the present invention, the conference call apparatus includes a digital signal processing unit 200, a memory 202 and a control signal generator 204. Reference numeral 205 represents continuously variable slope delta demodulation (CVSD) data line, and reference numerals 206 and 207 represent control lines. In particular, as shown in FIG. 3, the digital signal processing unit 200 includes a plurality of CVSD decoders 300,302 and 304, an adder 306 and a plurality of CVSD encoders 308, 310 and 312.

The control signal generator 204 receives or outputs CVSD data at a rate of 32 kbps from or to each subscriber which participates in a conference call, and generates a variety of control signals to control the digital signal processing unit 200 and the memory 202 via the control lines 206 and 207. The digital signal processing unit 200 converts the CVSD data received via the CVSD line 205 from the control signal generator 204 into pulse code modulation (PCM) data, sums PCM data from the other subscriber channels for each subscriber channel, and converts again the summed PCM data to CVSD data. Then, the CVSD data are output via the CVSD line 205 to the control signal generator 204. The control signal generator 204 transmits the received CVSD data to each subscriber terminal (not shown) through the corresponding channel. The memory 202 stores initiation and operation programs for the digital signal processing unit 200.

The digital signal processing unit 200 operates in three interrupt modes, including modes INT0, INT1 and INT2, for a conference call. The interrupt mode INT0 is for indicating the start and termination of a conference call, the interrupt mode INT1 is for decoding, summing and encoding the CVSD data input from the control signal generator 204, and the interrupt mode INT2 is for outputting the CVSD data to the control signal generator 204.

Figure 4:
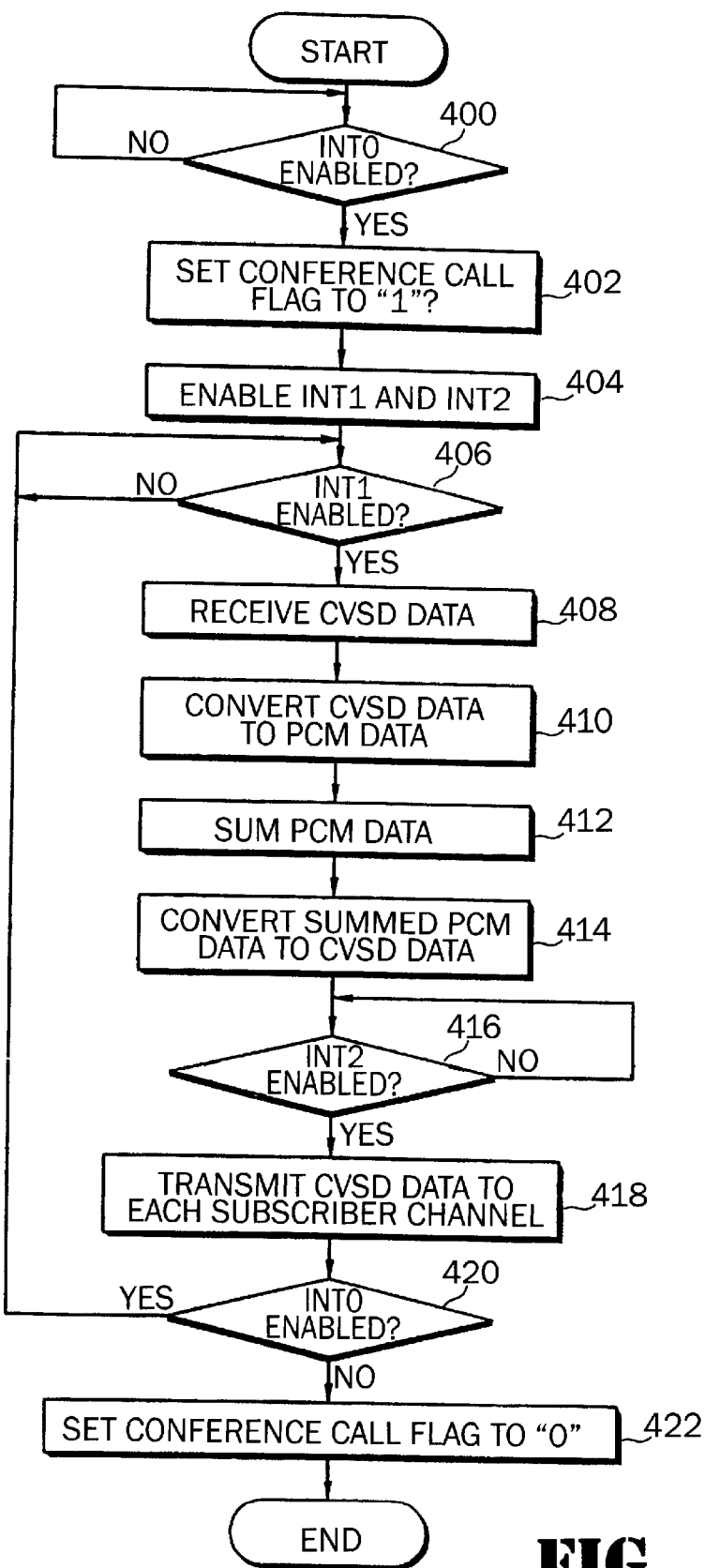
FIG. 4 is a flowchart illustrating a method for multi-access conference calling in an exchange system according to the present embodiment.

The operation of the conference call apparatus according to the present invention, and particularly, the operation of the digital signal processing unit 200 in each interrupt mode, will be described in detail with reference to FIG. 4.

First, when a subscriber presses a predetermined key for a conference call in an exchange system, the digital signal processing unit 200 is enabled to the mode INT0 (step 400). Then, the digital signal processing unit 200 sets a conference call flag, which is present therein, to "1" (step 402) to enable the modes INT1 and INT2 (step 404). If the digital signal processing unit 200 is in the mode INT1, decoding, summation and encoding are performed on the CVSD data (steps 408 through 414).

In particular, the CVSD decoders 300, 302 and 304 (see FIG. 3) receive the CVSD data of each subscriber channel from the control signal generator 204 (step 408), and convert the CVSD data $X_0(n)$ to PCM data $X(n)$ by the following equation (1) (step 410):

$$X(n)=\bar{K}\cdot\Delta(n)+(1-\bar{K})\cdot X_0(n-1) \quad (1)$$

where $\bar{K}$ is an experimental predictive filter coefficient, and $\Delta(n)$ is a step size for the conversion of CVSD data to PCM data.

The adder 306 sums PCM data of all channels except for the channel of the subscriber himself, for each subscriber channel, and then the summed PCM data for each channel is multiplied by a predetermined compensation ratio (step 412). The compensation ratio is an experimental value which optimizes the signal characteristics of the summed PCM data. Assume the number of subscriber channels is 3, and that the summation result is expressed by the following equation (2):

$$Sc_1=CR\cdot(Sc_2+Sc_3) \quad (2)$$

where $Sc_1$ is for subscriber channel 1, $Sc_2$ is for subscriber channel 2, $Sc_3$ is for subscriber channel 3 and CR is for compensation ratio. According to the equation (2), the PCM data of second and third subscriber channels $Sc_2$ and $Sc_3$ are summed for a first subscriber channel $Sc_1$. That is, the summation is for transmitting to one subscriber the voice signals of each to the other subscribers.

The CVSD encoders 308, 310 and 312 convert the summed PCM data $X(n)$ to CVSD data $X_0(n)$ by the following equation (3) (step 414):

$$X_0(n)=\bar{K}\cdot\Delta(n)+(1-\bar{K})\cdot X(n-1) \quad (3)$$

where $\bar{K}$ is the experimental predictive filter coefficient, and $\Delta(n)$ is the step size for the conversion of CVSD data to PCM data.

When the data conversion to the CVSD data is completed, the digital signal processing unit 200 checks whether the mode INT2 is enable (step 416), and then transmits the converted CVSD data to the control signal generator 204. Then, the control signal generator 204 transmits the received CVSD data to each corresponding subscriber channel (step 418). The digital signal processing unit 200 checks whether the mode INT0 is enabled (step 420). If the mode INT0 is still enabled, the process moves to the step 406 to continue the conference call. Meanwhile, if the mode INT0 is disabled, the digital signal processing unit 200 sets the conference call flag to "0" (step 422) to terminate the conference call.

As described above, the multi-access conference call in an exchange system according to the present invention is digitally carried out, so that disturbance by noise, such as that occurs due to digital-to-analog conversion, can be avoided. In addition, the size of conference group, i.e., the number of subscribers for a conference call, can be extended by changing a digital signal processing program in response to an increase in lines.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A multi-access conference call apparatus in an exchange system, which permits a number of subscribers to communicate with each other using their own terminal, the conference call apparatus comprising:

a digital signal processing unit for converting a signal of a first digital signal type from each of a plurality of subscriber channels to a signal of a second digital signal type, for summing the signals of the second digital signal type of all subscriber channels except for the signal from the subscriber's own channel, and for converting the summed data for each subscriber channel back to the signals of the first digital signal type, to output the resulting signals of the first digital signal type to each subscriber channel; and a control signal generator for generating control signals for transmitting the signals of the first digital signal type input from each subscriber channel, to the digital signal processing unit, and transmitting the signals of the first digital signal type output from the digital signal processing unit, to each corresponding subscriber channel.

2. The multi-access conference call apparatus of claim 1, wherein the digital signal processing unit comprises:
- a decoding unit for converting the signals of the first digital signal type input from each subscriber channel to the signals of the second digital signal type;
- an adder for summing the signals of the second digital signal type of all subscriber channels except for the subscriber's own channel, for each subscriber channel; and
- an encoding unit for converting the summed data of the signals of the second digital signal type to the signals of the first digital signal type for each subscriber channel.

3. The multi-access conference call apparatus of claim 2, wherein the decoding unit converts the signal of the first digital signal type, denoted by $X_0(n)$, to the signal of the second digital signal type, denoted by $X(n)$, by the following equation:

$$X(n)=\overline{K}\cdot\Delta(n) +(1-\overline{K})\cdot X_0(n-1)$$

where $\overline{K}$ is an experimental predictive filter coefficient, and $\Delta(n)$ is a step size for conversion of the signals of the first digital signal type to the signals of the second digital signal type.

4. The multi-access conference call apparatus of claim 2, wherein the adder sums the signals of the second digital signal type of all subscriber channels except for the subscriber's own channel and multiplies the summed signals of the second digital signal type, for each channel, by a predetermined compensation ratio which optimizes the characteristics of the summed signals.

5. The multi-access conference call apparatus of claim 2, wherein the encoding unit converts the summed signals of the second digital signal type, denoted by $X(n)$, to the signals of the first digital signal type, denoted by $X_0(n)$, by the following equation $$X_0(n)=\overline{K}\cdot\Delta(n) +(1-\overline{K})\cdot X(n-1)$$

where $\overline{K}$ is an experimental predictive filter coefficient, and $\Delta(n)$ is a step size for conversion of the signals of the first digital signal type to the signals of the second digital signal type.

6. A multi-access conference calling method, which permits a number of subscribers to communicate with each other using their own terminal, in an exchange system, the conference calling method comprising the steps of:
(a) a subscriber pressing a start key of a his or her terminal for a conference call with the other subscribers;
(b) the exchange system converting a signal of a first digital signal type received from each subscriber channel into a signal of a second digital signal type;
(c) the exchange system summing the signals of the second digital signal type of all subscriber channels except for the subscriber's own channel, for each subscriber channel;
(d) the exchange system converting the summed signals of the second digital signal type to the signals of the first digital signal type, and transmitting the resulting signals of the first digital signal type to each corresponding subscriber channel; and
(e) the subscriber pressing a termination key so as to terminate the conference call.

7. The multi-access conference calling method of claim 6, wherein the step (b) converts the signal of the first digital signal type, denoted by $X_0(n)$, to the signal of the second digital signal type, denoted by $X(n)$, by the following equation:

$$X(n)=\overline{K}\cdot\Delta(n) +(1-\overline{K})\cdot X_0(n-1)$$

where $\overline{K}$ is an experimental predictive filter coefficient, and $\Delta(n)$ is a step size for conversion of the signals of the first digital signal type to the signals of the second digital signal type.

8. The multi-access conference calling method of claim 6, wherein the step (c) sums the signals of the second digital signal type of all subscriber channels except for the subscriber's own channel and multiplies the summed signals of the second digital signal type, for each channel, by a predetermined compensation ratio which optimizes the characteristics of the summed signal.

9. The multi-access conference calling method of claim 6, wherein the step (d) converts the summed signal of the second digital signal type, denoted by $X(n)$, to the signal of the first digital signal type, denoted by $X_0(n)$, by the following equation:

$$X_0(n)=\overline{K}\cdot\Delta(n) +(1-\overline{K})\cdot X(n-1)$$

where $\overline{K}$ is an experimental predictive filter coefficient, and $\Delta(n)$ is a step size for conversion of the signals of the first digital signal type to the signals of the second digital signal type.

10. A multi-access conference calling method, which permits a number of subscribers to communicate with each other using their own terminal, in an exchange system, the conference calling method comprising the steps of:
- pressing a start key at one subscriber's terminal for initiating a conference call with the other subscribers;
- converting signals of a first digital signal type received from each subscriber's terminal into respective signals of a second digital signal type;
- summing the signals of the second digital signal type corresponding to all the subscriber's terminals to generate a plurality of summed signals of the second digital signal type, such that a subscriber terminal will not receive its own transmitted signal;
- converting the summed signals of the second digital signal type to resulting signals of the first digital signal type;
- transmitting the resulting signals of the first digital signal type to each corresponding subscriber's terminal; and
- pressing a termination key at a subscriber's terminal to terminate the conference call.

11. The multi-access conference calling method of claim 10, wherein the step of converting each signal of the first digital signal type to the signal of the second digital signal type comprises converting each signal of the first digital signal type to the signal of the second digital signal type by the following equation:

$$X(n)=\overline{K}\cdot\Delta(n) +(1-\overline{K})\cdot X_0(n-1)$$

where $X_0(n)$ is the signal of the first digital signal type, $X(n)$ is the signal of the second digital signal type, $\overline{K}$ is an experimental predictive filter coefficient, and $\Delta(n)$ is a step size for conversion of the signals of the first digital signal type to the signals of the second digital signal type.

12. The multi-access conference calling method of claim 10, wherein the step of converting the summed signal of the second digital signal type to the resulting signal of the first digital signal type comprises converting the summed signal of the second digital signal type to the resulting signal of the first digital signal type by the following equation:

$$X_0(n) = \overline{K} \cdot \Delta(n) + (1-\overline{K}) \cdot X(n-1)$$

where $X_0(n)$ is the resulting signal of the first digital signal type, $X(n)$ is the summed signal of the second digital signal type, $\overline{K}$ is an experimental predictive filter coefficient, and $\Delta(n)$ is a step size for conversion of the signals of the first digital signal type to the signals of the second digital signal type.

13. The multi-access conference calling method of claim 10, wherein the first digital signal type is a continuously variable slope delta modulation signal and the second digital signal is a pulse code modulation signal.

14. The multi-access conference calling method of claim 10, further comprising steps of:

determining whether a first interrupt is enabled, said first interrupt being enabled when said start key is pressed;

setting a conference call flag to a value of logic one when said first interrupt is enabled;

enabling a second interrupt and a third interrupt after setting the conference call flag to the value of logic one;

determining whether said second interrupt has been enabled;

performing said step of converting signals of the first digital signal type received from each subscriber's terminal into respective signals of the second digital signal type, when it is determined that said second interrupt has been enable;

determining whether said third interrupt has been enabled after performing said step of converting the summed signal of the second digital signal type to the resulting signal of the first digital signal type;

performing said step of transmitting when it is determined that said third interrupt has been enabled;

determining whether said first interrupt is disabled, said first interrupt being disabled when said termination key is pressed; and setting said conference call flag to a value of logic zero, when said first interrupt is disabled, and terminating the conference call.

* * * * *